Figure 1:
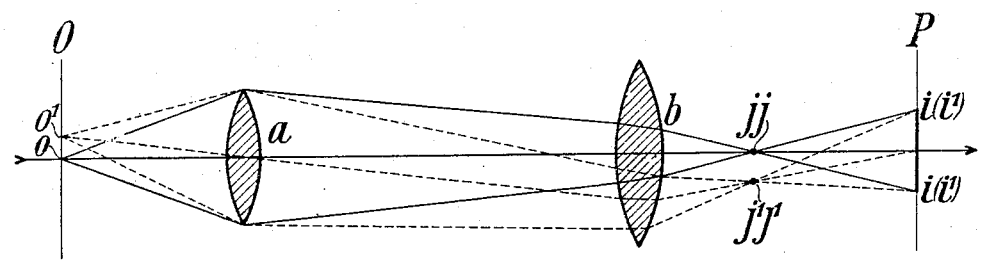

A. KÖHLER.
LENS SYSTEM FOR PROJECTING STRIPES.
APPLICATION FILED JULY 9, 1908.

988,720.

Patented Apr. 4, 1911.

Witnesses:
Paul Krüger
Fritz Sander

Inventor:
August Köhler.

UNITED STATES PATENT OFFICE.

AUGUST KÖHLER, OF JENA, GERMANY, ASSIGNOR TO THE FIRM OF CARL ZEISS, OF JENA, GERMANY.

LENS SYSTEM FOR PROJECTING STRIPES.

988,720.  Specification of Letters Patent.  Patented Apr. 4, 1911.

Application filed July 9, 1908.  Serial No. 442,698.

*To all whom it may concern:*

Be it known that I, AUGUST KÖHLER, a citizen of the German Empire, and residing at Carl-Zeiss strasse, Jena, in the Grand Duchy of Saxe-Weimar, Germany, have invented a new and useful Lens System for Projecting Stripes, of which the following is a specification.

The invention consists in an improved lens system for projecting an object consisting of one or several stripes—say a straight line, a spectrum, a scale division or the like—either on a screen or on a photographic surface in such a manner, that the scale of projection is smaller in the direction of the stripes than in the direction at right angles to them. For this purpose a spherico-cylindrical optical system has hitherto been made use of, which system was composed of two collective components, that is to say, of a front spherical component and a hinder cylindrical one, the latter having only one axis direction. This spherico-cylindrical system is orientated to the object, so that the direction of the stripes is crossed at right angles by the axis direction of the cylindrical component. The hinder of the two real astigmatic images of the object is then not only relatively shortened in the direction of the stripes but is also sharply defined at right angles to this direction. In the direction of the stripes, however, indistinctness occurs through which the shortening and the increase in illumination due to it are reduced. The reproduction is such, that object points, which succeed one another in the direction of the stripes, individually give rise to focal lines in the hinder astigmatic image, which are all equally long and lie in one and the same straight line, but are superimposed only partly in their length.

The invention has arisen from the knowledge that, given a certain distance of the spherico-cylindrical system from the object, the hinder astigmatic image also appears sharp in the direction of the stripes, and at the same time the said focal lines are completely superimposed. This distance is determined when the plane of the hinder astigmatic image of the object also contains the real astigmatic image, which the spherico-cylindrical lens system projects from the iris of its spherical component. The present improvement of the previous projection arrangement consists consequently in a suitable adjustment of the distance between the object and the spherico-cylindrical system, if the distances between the components of this system be given, or of the distance between the spherical and the cylindrical component, if the distance between the object and the spherical component be given. While the problem hitherto was to place the light sensitive surface, the projection screen or the ocular micrometer in the plane of the hinder astigmatic image, it is necessary, in order to bring about the improved projection, to first of all undertake an adjustment of the spherico-cylindrical system relatively to the object.

In the well known spherico-cylindrical system, from which the present invention starts, the spherical and the cylindrical lens system are in general embodied in separated lenses. If each of the two systems consist even of several single lenses, the spherical lenses need not necessarily be separated from the cylindrical ones, but both systems may intermingle in part.

A satisfactory realization of the invention requires, in general, a fixed relative distance between and a suitable correction of the two components of the system. The spherical component is suitably represented by any known collective system, for instance, by a photographic, telescopic or microscopic objective, the latter two with or without an ocular. This spherical component system has to be corrected to that object distance chosen, at which it projects the image to a convenient distance. The limiting of the image producing ray cones in the spherical component system may be effected by a special diaphragm placed before, behind or between the lenses of this system, or by the margin of one of these lenses. This ray limiting physical opening shall be termed, after Abbe, the iris of the system. The cylindrical component system must be arranged so that it projects in conjunction with the spherical one an astigmatic image of the iris of the spherical component into the plane of the hinder astigmatic image of the object. The astigmatic image of the iris ought to be sharply defined, consideration being of course confined to those plane pencils of rays, which run parallel to the direction of the stripes of the object. For this purpose the spherico-cylindrical system, in so far as it takes part in the reproduction of the iris, must first of all be aplanatic as regards the said plane pencils. If only rays essentially of one color be operative (for instance, yellow-green in subjective observation, blue-violet in photographic registration) this aplanatic correction suffices, otherwise a chromatic correction must be added. To effect this the well known means for such correction may be made use of.

Figure 2:
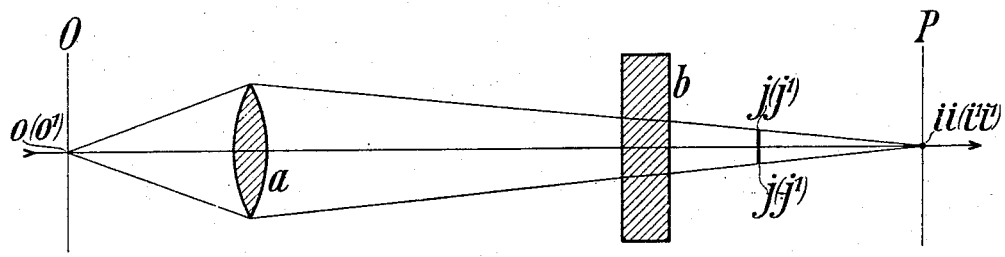

In the annexed drawing: Figure 1 is an axial section of a simple spherico-cylindrical system constructed according to the invention the plane of the section being parallel to the stripe direction in the object plane. Fig. 2 is an axial section of the same system at right angles to that in Fig. 1.

Referring to the drawing, the spherico-cylindrical system consists of a front spherical collective lens $a$ and a hinder cylindrical collective one $b$. The direction of the axis of the cylindrical lens $b$ crosses the direction the stripes have in the object plane O at right angles. The object point $o$ lying on the axis of the system $a\ b$ is reproduced by this system first in the focal line $j\ j$ and then, in the projection plane P proper, in the focal line $i\ i$. Similarly, the object point $o^1$, which lies in the axial plane shown in Fig. 1 and therefore away from $o$ in the direction of the stripes, is reproduced in the front focal line $j^1\ j^1$ and then in the hinder focal line $i^1\ i^1$. Since the distance between the object plane O and the spherico-cylindrical system $a\ b$ is determined according to the invention, the two focal lines $i\ i$ and $i^1\ i^1$ superimpose one another. The sharp margin of the spherical lens $a$ acts as iris in the example represented. The two points of this margin, which lie in the axial plane shown in Fig. 1, are each reproduced by the lens $b$ likewise in a focal line within the plane P. These two focal lines stand at right angles upon the axial plane shown in Fig. 1 and pass through the end points $i\ (i^1)$ of the superimposed focal lines $i\ i\ (i^1\ i^1)$ corresponding to the object points $o$ and $o^1$.

If the spherico-cylindrical system be intended to be appropriately corrected, an objective, corrected to the distance of the object plane O, takes as above mentioned the place of the simple collective lens. In the cylindrical lens $b$, for the pencils lying in the axial plane shown in Fig. 1 correction for spherical aberration and the fulfilment of the sine condition would have to be undertaken, as for example, by deforming one or both of the cylindrical surfaces. Chromatic correction could, for example, be attained by substituting a system consisting of a plurality of lenses made from crown and flint glass for the lens $b$.

I claim:

A corrected spherico-cylindrical optical system composed of two collective component systems of fixed distance from each other, a front spherical component system and a hinder cylindrical one, the latter having only one axis direction, and the spherical component system being corrected to an object distance, in consequence of which distance the hinder real astigmatic image of the object falls in the plane, where the real astigmatic image of the iris of the spherical component system is reproduced.

AUGUST KÖHLER.

Witnesses:
 PAUL KRÜGER,
 FRITZ SANDER.